United States Patent
Kirsch (10) Patent No.: US 8,892,175 B2
(45) Date of Patent: Nov. 18, 2014

(54) CONNECTED PHONE SYSTEM AND METHOD WITH ASSOCIATED BANDWIDTH CONNECTIONS IN A VEHICLE ENVIRONMENT

(75) Inventor: David Kirsch, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 167 days.

(21) Appl. No.: 13/459,203

(22) Filed: Apr. 29, 2012

(65) Prior Publication Data
US 2013/0288606 A1    Oct. 31, 2013

(51) Int. Cl.
*H04M 1/00* (2006.01)
*H04B 1/034* (2006.01)
*G01C 22/00* (2006.01)

(52) U.S. Cl.
USPC ............................. 455/569.2; 455/99; 701/24

(58) Field of Classification Search
CPC ................................................... H04W 28/06
USPC ........... 455/1.1–41.3, 99, 569.2; 701/1–2, 24, 701/33.3
See application file for complete search history.

(56) References Cited

U.S. PATENT DOCUMENTS

| | | | |
|---|---|---|---|
| 7,840,314 B2 | 11/2010 | Simon | |
| 2002/0156950 A1 | 10/2002 | Loh et al. | |
| 2003/0129961 A1* | 7/2003 | Weisshaar et al. | 455/403 |
| 2003/0130005 A1 | 7/2003 | Weisshaar et al. | |
| 2006/0114881 A1* | 6/2006 | Chari et al. | 370/351 |
| 2007/0100507 A1* | 5/2007 | Simon | 701/1 |
| 2009/0111378 A1* | 4/2009 | Sheynman et al. | 455/41.1 |
| 2009/0125178 A1 | 5/2009 | Wilson | |
| 2010/0075655 A1 | 3/2010 | Howarter et al. | |
| 2010/0177711 A1 | 7/2010 | Gum | |
| 2010/0333146 A1 | 12/2010 | Pickney et al. | |
| 2011/0066722 A1 | 3/2011 | Yamashita | |

* cited by examiner

*Primary Examiner* — Sonny Trinh
*Assistant Examiner* — Cindy Trandai
(74) *Attorney, Agent, or Firm* — Fenwick & West LLP

(57) ABSTRACT

A system and method for connection management between a consumer device and a vehicle. The connection management is performed automatically using a computing device, e.g., an application executing on a smartphone. The system and method configure the vehicle and consumer device in a manner that optimizes the vehicle and consumer device connections based on a variety of factors such as available connections/ports and protocols to be used.

20 Claims, 6 Drawing Sheets

| Service | Phone Voice | Phone Data | Music Audio | Music Data | Video Audio | Video Data | Internet Access |
|---|---|---|---|---|---|---|---|
| Bluetooth HFP | O | O | X | X | X | X | X |
| Bluetooth PBAP | X | O | X | X | X | X | X |
| Bluetooth SPP | X | X | X | O | X | O | O |
| Bluetooth A2DP | X | X | O | X | O | X | X |
| Bluetooth AVRCP | X | X | X | O | X | O | X |
| HDMI | X | X | X | X | O | O | X |
| Wi-Fi | X | X | O | O | O | O | O |
| Infrared Serial | X | O | X | O | X | X | X |
| Auxiliary Jack | O | X | O | X | O | X | X |
| BEV Charging Connection | X | X | X | X | X | X | O |

Features/Services 310

Connections/Protocols 305

Figure 3

| Service | Phone Voice | Phone Data | Music Audio | Music Data | Video Audio | Video Data | Internet Access |
|---|---|---|---|---|---|---|---|
| Bluetooth HFP | O | O | X | X | X | X | X |
| Bluetooth PBAP | X | O | X | X | X | X | X |
| Bluetooth SPP | X | X | X | O | X | X | O |
| Bluetooth A2DP | X | X | O | X | X | X | X |
| Bluetooth AVRCP | X | X | X | X | X | X | X |
| HDMI | X | X | X | X | X | X | X |
| Wi-Fi | X | X | X | X | O | O | X |
| Infrared Serial | X | X | X | X | X | X | X |
| Auxiliary Jack | X | X | X | X | X | X | X |
| BEV Charging Connection | X | X | X | X | X | X | X |

Connections/Protocols 305

Features/Services 310

| Priority | Transport Type | Transport Method | Design Reasoning |
|---|---|---|---|
| 1 | Wired | USB (MHL) | High quality, powered connection |
| 2 | Wired | HDMI | Robust connection |
| 3 | Wireless | DLNA (Wi-Fi) | Standard codecs, easy connection |
| 4 | Wireless | Bluetooth SPP | Low quality, non-powered |

Figure 6

CONNECTED PHONE SYSTEM AND METHOD WITH ASSOCIATED BANDWIDTH CONNECTIONS IN A VEHICLE ENVIRONMENT

FIELD OF THE INVENTION

This application relates to automobiles and more particularly to vehicle pairing with communication devices.

BACKGROUND

The use of consumer devices such as smartphones have become ubiquitous in the last few years and communication between consumer devices and an automotive vehicle have existed in one form of another for years. Examples include the connection of MP3 players to analog Auxiliary Jacks, iPods being connected via USB connections, and cellular phones being connected via wireless Bluetooth connections. All of these provide methods to bring content to and from the vehicle and allow a user to have some connectivity while in the vehicle.

While a vehicle can be connected to multiple consumer devices there is currently no method of effectively leveraging the connection options of the consumer device and the connection options of a vehicle.

SUMMARY

A system and method for connection management between a consumer device and a vehicle. The connection management is performed automatically using a computing device, e.g., an application executing on a smartphone. The system and method configure the vehicle and consumer device in a manner that optimizes the vehicle and consumer device connections based on a variety of factors such as available connections/ports and protocols to be used.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments are now described with reference to the figures where like reference numbers indicate identical or functionally similar elements. Also in the figures, the left most digit of each reference number corresponds to the figure in which the reference number is first used.

Figure 1:
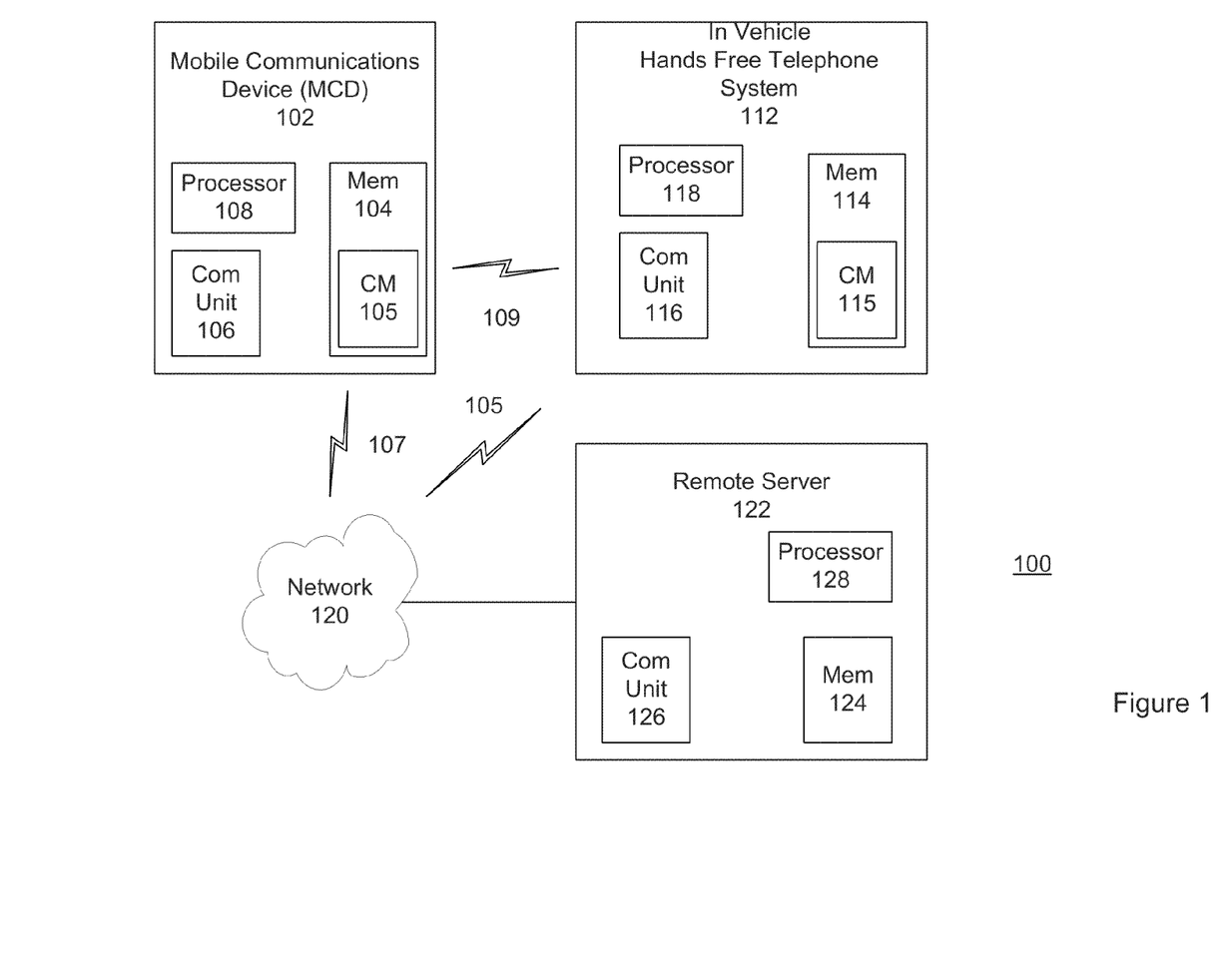
FIG. 1 is an illustration of an environment in which one embodiment may operate.

FIG. 1 illustrates an exemplary operating environment 100 for various embodiments. Operating environment 100 may include an in-vehicle communications system, one example of such a system is an in-vehicle hands free telephone (HFT) system 112 which will be used as an example herein for ease of discussion. The operating environment 100 may also include a wireless mobile communication device (MCD) 102, a communication link 105 for communications between the in-vehicle system 112 and a network 120, a short-range communication link 109 for communication between the in-vehicle system 112 and wireless mobile communication device 102, a wireless networking communication link 107 between wireless mobile communication device 102 and network 120, and a processing device, such as a server 122 connected to network 120. The communication links described herein can directly or indirectly connect these devices. The network 120 can be a wireless communication network such as a cellular network comprised of multiple base stations, controllers, and a core network that typically includes multiple switching entities and gateways, for example.

In-vehicle hands free telephone (HFT) system 112 and wireless mobile communication device (MCD) 102 may communicate with each other via a short-range communication link 109 which uses short-range communication technology, such as, for example, Bluetooth® technology or other short-range communication technology, for example, Universal Serial Bus (USB). In-vehicle HFT system 112 and wireless mobile communication device 102 may connect, or pair, with each other via short-range communication link 109. In an embodiment the HFT system 112 can include a communications unit 116 to assist in the short range communications, a memory unit device 114, and a processor 118. The HFT system 112 can be part of a vehicle's telematics system which includes memory/storage, processor(s) and communication unit(s). FIG. 1 shows the memory 114, communication unit 116 and processor 118 as being part of the in-vehicle HFT system 112 for ease of discussion. In alternate embodiments the HFT system 112 can utilize the vehicle's telematics unit to assist in performing various functions. For example the communications unit 116 and/or processor 118, for example, can be part of the vehicle's telematics unit or can be a separate unit in the vehicle. The MCD 102 has an operating system and can include various applications either integrated into the operating system or stored in memory/storage 104 and executed by the processor 108.

Processors 108, 118 and/or 128 process data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processors can comprises an arithmetic logic unit, a microprocessor, a general purpose computer, or some other information appliance equipped to transmit, receive and process electronic data signals from the memory 104, 114, 124, and other devices both shown and not shown in the figures.

Examples of a wireless mobile communication device (MCD) 102 include a cellular phone, personal device assistant (PDA), smart phone, pocket personal computer (PC), laptop computer, tablet computer, smart watch or other devices having a processor, communications capability and are easily transportable, for example. In a common form, an MCD application could be part of a larger suite of vehicle features and interactions. Examples of applications include applications available for the iPhone™ that is commercially available from Apple Computer, Cupertino, Calif., applications for phones running the Android™ operating system that is commercially available from Google, Inc., Mountain View, Calif., applications for BlackBerry devices, available from RIM, Ontario Canada, and/or applications available for Windows Mobile devices, available from Microsoft Corp., Redmond, Wash. In an embodiment the MCD 102 includes a communications unit 106 a memory unit device 104, and a processor 108. The MCD 102 has an operating system and can include various applications either integrated into the operating system or stored in memory/storage 104 and executed by the processor 108.

In alternate embodiments a mobile communication device 102 can be used in conjunction with a communication device embedded in the vehicle, such as a vehicle embedded phone, a wireless network card or other device (e.g., a Wi-Fi capable device). For ease of discussion the description herein describes the operation of the embodiments with respect to an embodiment using a mobile communication device 102. However, this is not intended to limit the scope of the embodiments and it is envisioned that other embodiments operate using other communication systems between the in-vehicle system 112 and the network 120, examples of which are described herein.

In-vehicle system 112 may send information to wireless mobile communication device 102. Wireless mobile communication device 102 may send information to in-vehicle system 112 via short-range communication link 109. Wireless mobile communication device 102 may store information received from in-vehicle system 112, and/or may provide the information to a remote processing device, such as, for example, server 122, via network 120. Remote server 122 can include a communications unit 126 to connect to the network 120, for example, a memory/storage unit 124 and a processor 128.

In some embodiments, in-vehicle system 112 may provide information to the wireless mobile communication device 102. Wireless mobile communication device 102 may use that information to obtain additional information from network 120 and/or server 122. The additional information may also be obtained in response to providing information with respect to a prompt on wireless mobile communication device 102 from in-vehicle system 112.

Network 120 may include a wireless communication network, for example, a cellular telephony network, as well as one or more other networks, such as, the Internet, a public-switched telephone network (PSTN), a packet-switching network, a frame-relay network, a fiber-optic network, and/or other types of networks.

Figure 2:
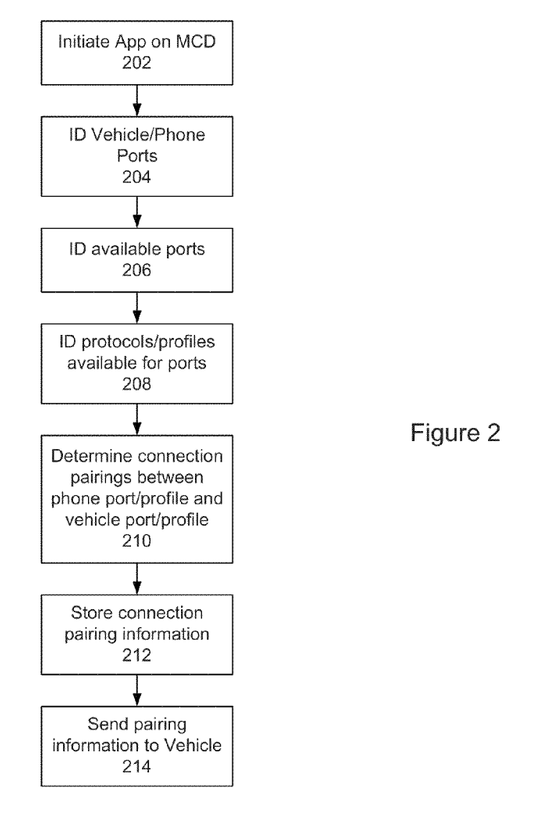
FIG. 2 is a flowchart of a method in accordance with one embodiment.

FIG. 2 is a flowchart of a method in accordance with one embodiment. In an embodiment a software module is executed on in vehicle HFT system 112 and can also include software executed on the MCD 102. The software module can be a software program, e.g., a connections manager 115, that is stored in memory 114. The software can also take the form of or can include an application, such as an iPhone™ or Android™-based application. The application can be stored on the MCD 102 and can be part of the embedded software of the MCD 102 (e.g., phone) or integrated into the MCD's 102 operating system. Alternatively, the application can be downloaded via a wired or wireless system, e.g., using Apple's iTunes™. In addition, in an embodiment the software module can be part of any of a variety of software paradigms, e.g., software as a service (SaaS), cloud computing. For ease of discussion, the following description will be based on the model of the software module being an application that is stored in the MCD memory module 104 and executed by the MCD processor 108. The software module will be referred to as a Honda application (app), although the application does not need to be created by Honda.

In automotive vehicles, connectivity is available in many forms for the user. Example of connection options between a user device and a vehicle include Bluetooth, USB ports, HDMI (high-definition multimedia interface) ports, WiFi, an infrared serial, an auxiliary jack and a battery electric vehicle charging connection. Such connectivity could be accomplished using any technology applied over these physical connections, examples include digital living network alliance (DLNA) audio/video streaming which uses WiFi as a physical medium, mobile hi-definition line (MHL) which uses a physical USB connection to transfer HDMI-type content. In particular, vehicles can use Hands-Free phone systems using Bluetooth and/or a USB connection to connect both iPods/iPhones and mass storage devices to the audio systems, and/or HDMI ports to connect input video data on the rear entertainment video System. Connectivity methods often need a solution to help the customer control them. Today, the phone is the hub for many of these connections and related media and the embodiments provide a connection management solution using a user device, e.g., smartphone. In alternate embodiments, the vehicle can provide the connection management solution/tools without requiring the use of a smartphone.

The embodiments provide a management tool for the many connections between consumer devices and the vehicle. For Smartphones, the tool embodies software that the customer can install on the Smartphone. This software is able to manage the many connections to the vehicle. In embodiments, the software can make a new connection or open an existing connection and is able to direct the information across any application connection to provide a high quality experience for the user.

In an embodiment the software is a connection manager and can manage secondary high-bandwidth connections (e.g. Wi-Fi, USB, etc), this manager can turn those connections on, structure the communication style for that connection, and direct the correct media across that connection. In addition, the primary communication between the management tool and the vehicle can inform the vehicle systems of the status of the various connections.

The term Bluetooth as used herein can include any of a variety of Bluetooth protocols or profiles. A Bluetooth profile is a wireless interface specification for Bluetooth-based communication between devices. In order to use Bluetooth technology, a device must be compatible with the subset of Bluetooth profiles necessary to use the desired services. A Bluetooth profile resides on top of the Bluetooth Core Specification and (optionally) additional protocols. While the profile may use certain features of the core specification, specific versions of profiles are rarely tied to specific versions of the core specification. For example, there are hands-free profile (HFP) 1.5 implementations using both Bluetooth 2.0 and Bluetooth 1.2 core specifications.

The way a device uses Bluetooth technology depends on its profile capabilities. The profiles provide standards which manufacturers follow to allow devices to use Bluetooth in the intended manner. For the Bluetooth low energy stack according to Bluetooth V4.0 a special set of profiles applies.

Each profile specification can include information on the following topics: (a) dependencies on other formats, (b) suggested user interface formats, and/or (c) specific parts of the Bluetooth protocol stack used by the profile. To perform its task, each profile uses particular options and parameters at each layer of the stack. This may include an outline of the required service record, if appropriate. Details of some examples of Bluetooth profiles are set forth below.

The advanced audio distribution profile (A2DP) defines how high quality audio can be streamed from one device to another over a Bluetooth connection. For example, music can be streamed from a smartphone, to a wireless headset or vehicle audio system, for example. A2DP was initially used in conjunction with an intermediate Bluetooth transceiver that connects to a standard audio output jack, encodes the incoming audio to a Bluetooth-friendly format, and sends the signal wirelessly to Bluetooth headphones that decode and play the audio. Some Bluetooth headphones provide a microphone and support for the Headset (HSP), Hands-Free (HFP) and Audio/Video Remote Control (AVRCP) profiles.

The audio/video remote control (AVRCP) profile is designed to provide a standard interface to control TVs, Hi-fi equipment, etc. to allow a single remote control (or other device) to control all of the A/V equipment to which a user has access. It may be used in concert with A2DP or VDP.

A device ID profile (DIP) allows a device to be identified above and beyond the limitations of the device class already available in Bluetooth. It enables identification of the manufacturer, product id, product version, and the version of the Device ID specification being met. It is useful in allowing a computing device to identify a connecting device and download appropriate drivers. It enables similar applications to those the Plug-and-play specification allows.

The hands-free profile (HFP) is commonly used to allow car hands-free kits to communicate with Smartphones in the car. It uses a synchronous connection-oriented (SCO) link to carry a monaural audio channel with continuously variable slope delta modulation or pulse-code modulation.

The message access profile (MAP) specification allows an exchange of messages between devices in particular for vehicle handsfree use.

The object push profile (OPP) is a basic profile for sending "objects" such as pictures, virtual business cards, or appointment details. It is called push because the transfers are initiated by the sender (client), not the receiver (server). OPP uses the application programming interfaces (APIs) of OBEX profile and the object exchange (OBEX) operations which are used in OPP are connect, disconnect, put, get and abort. By using these APIs the OPP layer resides over OBEX and hence follow the specifications of the Bluetooth stack.

A personal area networking profile (PAN) allows the use of Bluetooth Network Encapsulation Protocol on Layer 3 protocols for transport over a Bluetooth link.

A phone book access profile (PBAP, PBA) is a profile that allows the exchange of phone book objects between devices. It can be used between a vehicle and a mobile phone to allow the vehicle to display the name of the incoming caller and/or allow the vehicle to download the phone book so the user can initiate a call from the vehicle's display.

A serial port profile (SPP) is based on European Telecommunications Standards Institute (ETSI) versions 07 and 10 and the radio frequency communication (RFCOMM) protocol. The SPP emulates a serial cable to provide a simple substitute for existing RS-232.

A service discovery application profile (SDAP) describes how an application should use the session description protocol (SDP) to discover services on a remote device. SDAP enables applications be able to find out what services are available on Bluetooth enabled devices to which it connects.

A subscriber identity module (SIM) access profile (SAP, SIM, rSAP) allows devices such as car phones with built in GSM (Global System for Mobile Communication) transceivers to connect to a SIM card in a phone with Bluetooth, thus the car phone itself doesn't require a separate SIM card. This profile is also known as rSAP (remote-SIM-Access-Profile).

A video distribution profile (VDP) allows the transport of a video stream. It can be used for streaming a recorded video from a PC media center to a portable player, or a live video from a digital video camera to a TV.

It is envisioned that alternate embodiments of the connection manager 105/115 can recognize and control protocols/profiles/connections that are different from those protocol examples set forth herein.

With respect to FIG. 2, one embodiment is a method and corresponding system to perform an automatic setup/check of the total telematics system communications capabilities at the vehicle startup. Although this can be stored in memory for future connections, this setup can occur when connected to or just after the phone is connected with the vehicle by initiating 202 an application on the MCD 102. In an embodiment the application can be initiated by a user of the MCD 102, in another embodiment the application can be initiated by the connection manager 115.

Figure 3:
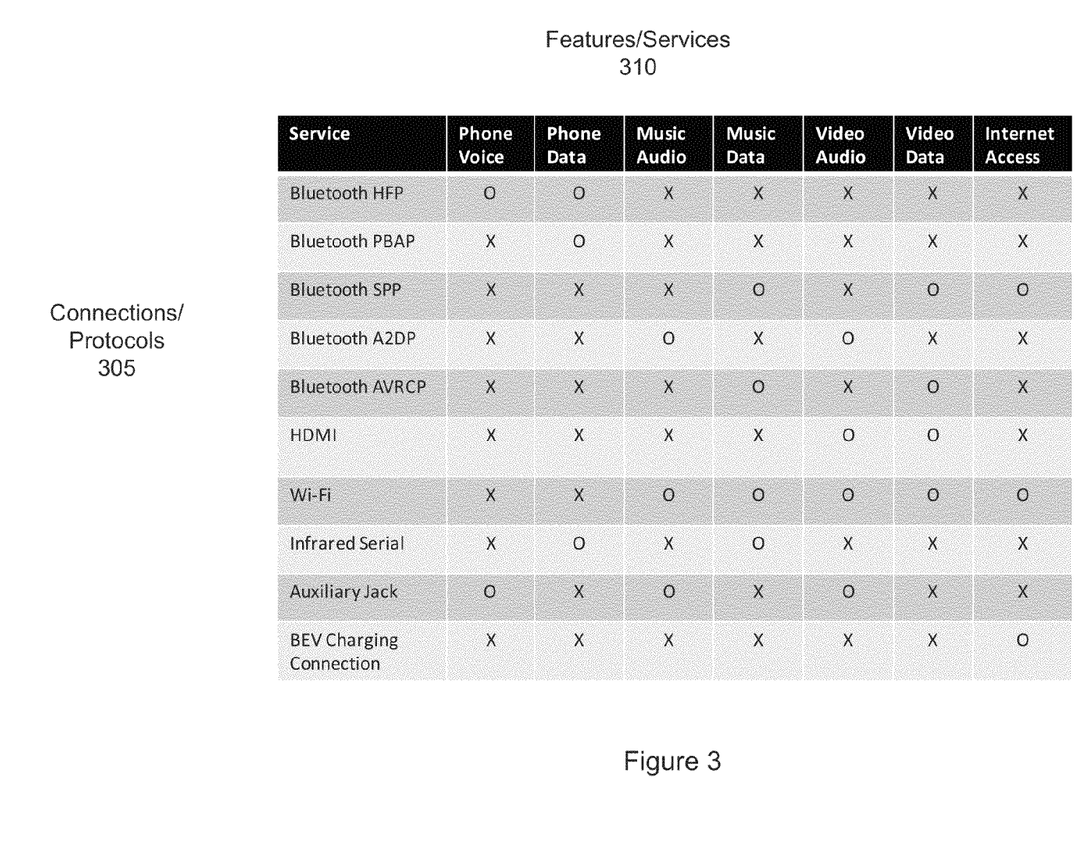
FIG. 3 is an illustration of a matrix representing an example of connection optimization management showing possible connection options in accordance with one embodiment.
Figure 6:
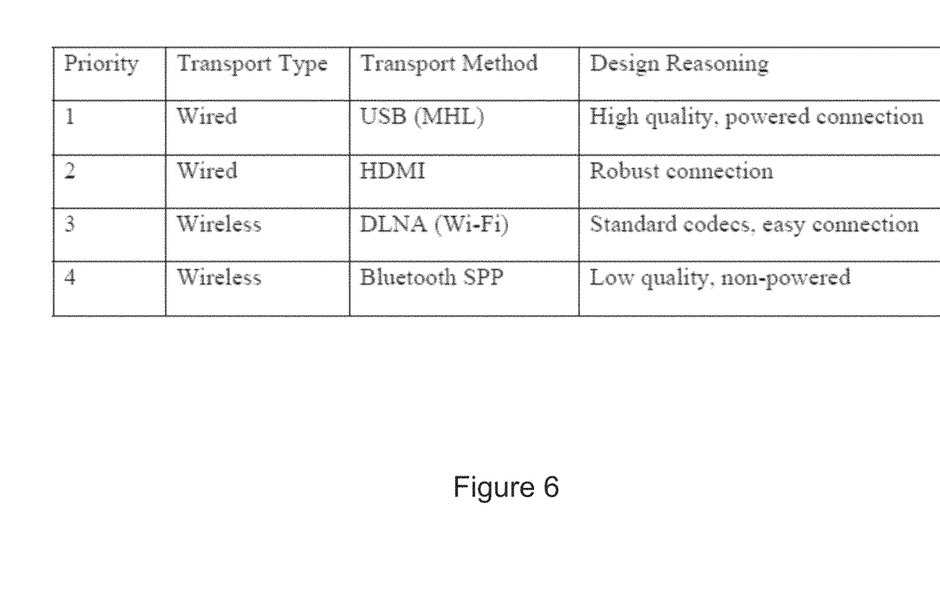
FIG. 6 is an illustration setting forth an example of a priority system for ports without a discovery protocol in accordance with one embodiment.

In an embodiment the connection manager software 115 in the HFT 112 or the connections manager software 105 in the MCD 102 exchanges capability information with the vehicle system and populates a table outlining the connections available and possible features that are related, an example of which is shown in FIG. 3. In particular the connections manager 105/115 identifies 204 vehicle, phone and consumer device ports, or other devices such as those not permanently affixed to the vehicle (e.g., an accessory DVD player). As noted, the service table formation can include basic capabilities of both the vehicle and consumer devices. The process of identifying all devices possible to connect with the system is a two part process: (1) search available; (2) identify capabilities. To search the available, the connection manager 105 uses discovery methods on all of its connection ports. For ports with discovery protocols, this can be aggregation of the capabilities advertised by the discovery protocols (e.g., Bluetooth SDAP). For ports without discovery protocols, the system can first determine if a device is physically (or wirelessly) connected and then attempt to communicate with the device by known/supported language methods. If successful, the device type is recorded. To identify the capabilities, the connection manager will first reference the known capabilities directed by the standards for the connection. This can be the capabilities defined by the Bluetooth protocol or the capabilities available for a specific type of connected device over USB, for example. FIG. 6 is an illustration setting forth an example of a priority system for ports without a discovery protocol. For example, priority 1 is a USB (MHL) connection if the transport type is wired in order to have a high quality, powered connection. Priority 2 can be an HDMI connection if the transport type is wired in order to have a robust connection. Priority 3 can be a DLNA (Wi-Fi) connection if the transport type is wireless in order to have an easy connection using standard codecs and priority 4 can be a Bluetooth SPP connection if the transport type is wireless which is a lower quality, non-powered connection. Depending on system hardware and software, only a portion of the connection methods may be available. For example, on some systems, there may also be constraints on the ability to run multiple connections or services concurrently. Accordingly, the connections manager 105/115 identifies 206 those ports that are available for use. The connections manager 105/115 also identifies 208 the protocols/profiles that are available to the ports, an example of which is shown in FIG. 3 which is described in greater detail below.

FIG. 3 is an illustration of a matrix representing an example of connection optimization management showing available connection options, such as protocols/profiles, in accordance with one embodiment. The connection manager software identifies the connections/protocols that are available 305 and possible features/services 310 that can be used. In the example illustrated in FIG. 3 the connections/protocols 305 that are available include: Bluetooth HFP, Bluetooth PBAP, Bluetooth SPP, Bluetooth A2DP, Bluetooth AVRCP, HDMI, Wi-Fi, Infrared Serial, Auxiliary Jack, and a battery electric vehicle (BEV) charging station. It is envisioned that additional connections, e.g., protocols and/or connections, can be used without departing from the scope of the embodiments, e.g., future wireless protocols. The possible features 310 in the example illustrated in FIG. 3 include: phone voice, phone data, music audio, music data, video audio, video data, and Internet access.

In this example, phone voice communication can use a Bluetooth HFP connection or an auxiliary jack connection. Phone data can use a Bluetooth HFP connection, a Bluetooth PBAP connection, or an Infrared Serial connection. Music Audio can use a Bluetooth A2DP connection, a Wi-Fi connection, or an auxiliary jack connection. Music data can use a Bluetooth SPP connection, a Bluetooth AVRCP connection, a Wi-Fi connection or an Infrared Serial connection. Video audio can us a Bluetooth A2DP connection, an HDMI connection, a Wi-Fi connection or an auxiliary jack connection. Video data can use a Bluetooth SPP connection, Bluetooth AVRCP connection, an HDMI connection, or a Wi-Fi connection. Internet access can be via a Bluetooth SPP connection, a Wi-Fi connection or a BEV charging connection.

Once the service table information has been determined, the system determines 210 the connection pairings between connections/protocols and the requested services/features. In an embodiment, rules and guidelines are applied for the preferred transfer medium relating to the specific situation and combination of technologies being utilized. In an embodiment these rules may include primary and secondary choices for a specific data type for a particular service/feature. For example, the software may choose to use Bluetooth SPP to move Audio metadata to the vehicle. This can correspond to the text and graphics from an Internet Radio station. The software can also have the capability to stream high-definition video to the vehicle for routing to the rear entertainment system. The video may have a preferred transfer medium of the Bluetooth SPP, but considering that the SPP is to be used concurrently, and weighing the other methods for music data, the connections manager 115 or the corresponding application in the MCD 102 (connections manager 105) may choose to make the connection over an ad-hoc Wi-Fi connection. At that point, if the rules are applied by software external to the vehicle, e.g., in the MCD 102, the choices can be sent to the connections manager 115 and that selection can be entered into a table reference for the vehicle's systems. That table displays the chosen connection methods for each service (see FIG. 4). In one embodiment, a basic table with weighted connection methods may be used by the system. Such a table can include the rules shown in FIG. 4. Here the weighting of the video connection methods is shown for one embodiment, based on the available connection.

Figure 4:
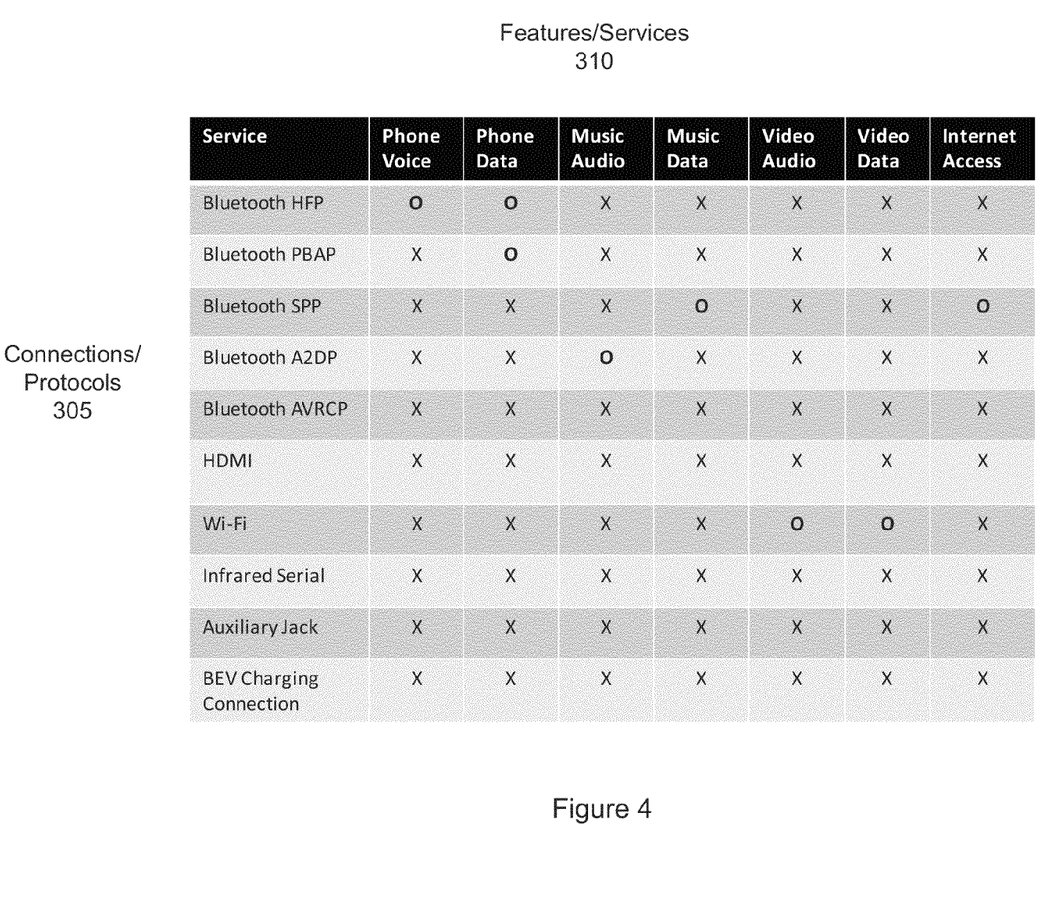
FIG. 4 is an illustration of a matrix representing an example of connection optimization management showing selected connection options in accordance with one embodiment.

FIG. 4 is an illustration of a matrix representing an example of connection optimization management showing selected connection options in accordance with one embodiment. The connection manager software identifies the connections/protocols that are available 305, the possible features/services 310 that can be used along with the assigned pairings/connections. As is shown in FIG. 4 features/services are assigned a connection method. In some cases, a single connection method can support more than one service. In that case, a conventional multiplexing techniques occur in order for the signal to be transmitted and received correctly. In one embodiment the vehicle table reference of FIG. 4 can be used by the connections manager 105/115 to initiate the multiplexing technique when needed. The multiplexing technique can read the necessities from the table and then structure the system automatically to have the correct multiplexing. An example is shown for Bluetooth SPP. In the example illustrated in FIG. 4, both the music data and the Internet access are being setup to use the Bluetooth SPP to the phone. In this example, the connections manager 105/115 can instruct the multiplexing engine, which can be part of communication unit 116 and/or communications unit 106, to initiate communication using multiplexing. The multiplexing engine can receive the names/IDs of the services and automatically add them, i.e., add them without user involvement. The settings can be shared with both sides of the connection and the multiplexing setup would be complete. The assigned pairing are then stored 212 and the connection/pairing information is sent 214 to the vehicle if the connection module 105 in the MCD 102 performs the pairings. Alternatively, the connection/pairing information is sent 214 to the MCD 102 if the connection module 115 in the vehicle performs the pairings.

With reference to the example illustrated in FIG. 4, the assigned connections/protocols for each feature/service are: Phone voice uses Bluetooth HFP, Phone data uses Bluetooth HFP and Bluetooth PBAP, music audio uses Bluetooth A2DP, music data uses Bluetooth SPP, video audio uses Wi-Fi, video data uses Wi-Fi, and internet access is accomplished using a Bluetooth SPP connection.

Additional features will be possible using this technology. In an embodiment logic is included in memory 104/114, for example, to manage the battery life of the phone and adapt depending on power requirements. An example of this is to allow Wi-Fi to be active only when the system is plugged into a power source. Also, the system can provide choices to the customer to adapt the connections in various situations, e.g., while the connection is being used or while the vehicle is in operation. Then, if there is a need to change a setting (low battery and high system power draw), the customer can reconfigure in a quick, convenient way.

Figure 5:
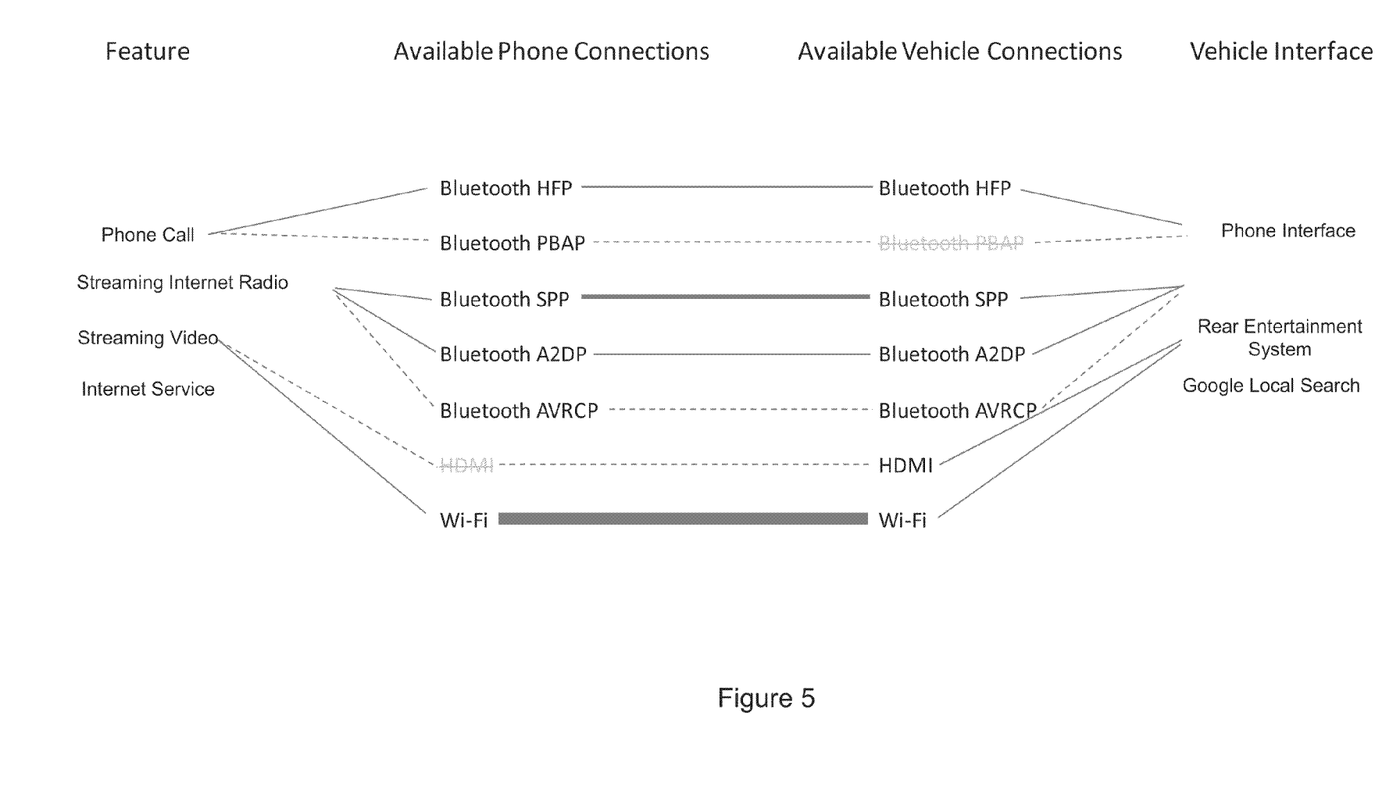
FIG. 5 is an illustration representing connection optimization management in accordance with one embodiment.

FIG. 5 is an illustration representing connection optimization management in accordance with one embodiment. In this example, the line width represents the communication capacity, e.g., the Wi-Fi connection provides the largest bandwidth for communication between the vehicle and connected devices such as the MCD 102. In this example the phone call feature can use either the Bluetooth HFP or Bluetooth PBAP. However in this example, the vehicle does not have a Bluetooth PBAP connection available for the phone interface. Therefore, the Bluetooth HFP connection is assigned to the phone call. Similarly for streaming Internet radio the available MCD 102 connections are Bluetooth SPP, Bluetooth A2DP and Bluetooth SVRCP. These three connections are available at the vehicle. The connection manager 105 or 115 assigns the Bluetooth SPP and the Bluetooth A2DP connections for the streaming Internet radio and connection it to the main audio system vehicle interface. A video connection, e.g., Netflix video, can use either HDMI or Wi-Fi. However the MCD 102 does not have an available HDMI connection so the connection manager 105 or 115 assigns the Wi-Fi to this feature which connections the video stream to the vehicle's rear entertainment system interface.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method for connecting data related to a first and second feature, the first and second feature data communicated from at least one device to a vehicle comprising the steps of:
    determining available device connections of the device, wherein the device is not permanently affixed to the vehicle, said available device connections include one or more wired connections and one or more wireless connections;
    determining available vehicle connections of the vehicle, said available vehicle connections include one or more wired connections and one or more wireless connections;
    identifying first feature device connections, including a first and second device connection capable of communicating data related to the first feature;
    identifying second feature device connections, including a third and forth device connection capable of communicating data related to the second feature;
    identifying at least one vehicle connection, including a first vehicle connection, capable of communicating with at least one of said first and second device connections;

identifying at least one vehicle connection, including a second vehicle connection, capable of communicating with at least one of said third and forth device connections;

using a first set of guidelines to assign at least one device connection and at least one vehicle connection to each of the first and second features based on said first feature device connections, second feature device connections, said first vehicle connection, and said second vehicle connection;

transmitting said assigned at least one device connection and at least one vehicle connection for the first feature to the device and to the vehicle; and transmitting said assigned at least one device connection and at least one vehicle connection for the second feature to the device and to the vehicle.

2. The method of claim 1, wherein said vehicle connections include at least one of a Bluetooth based protocol, an HDMI connection, a Wi-Fi connection, an infrared based protocol, an auxiliary jack or a connection from a battery electric vehicle charging station.

3. The method of claim 1, wherein at least one of the devices is a mobile communication device.

4. The method of claim 1, wherein said first set of guidelines include:
identifying a first set of device connections that can support successfully transmitting data for providing said first feature; and
identifying a first set of vehicle connections that can support successfully transmitting data for providing said first feature.

5. The method of claim 4, wherein said first set of guidelines includes:
determining whether a bandwidth of each device connection in said first set of device connections can support said first feature.

6. The method of claim 4, wherein said first set of guidelines include:
identifying a second set of device connections that can support successfully transmitting data for providing said second feature; and
identifying a second set of vehicle connections that can support successfully transmitting data for providing said second feature.

7. The method of claim 6, wherein said first set of guidelines includes:
determining whether a bandwidth of each device connection in said second set of device connections can support said second feature.

8. The method of claim 1 wherein said step of using a first set of guidelines includes:
using said first set of guidelines to assign a first connection pair having at least one device connection and at least one vehicle connection for supporting communication of said first feature between the device and the vehicle, said first set of guidelines based on said first feature device connections, second feature device connections, said first vehicle connection, and said second vehicle connection; and
using said first set of guidelines to assign a second connection pair having at least one device connection and at least one vehicle connection for supporting communication of said second feature between the device and the vehicle, said first set of guidelines based on said first feature device connections, second feature device connections, said first vehicle connection, and said second vehicle connection.

9. The method of claim 1 wherein said assigned at least one device connection and assigned at least one vehicle connection support a wireless connection between the device and vehicle.

10. A system for connecting data related to a first and second feature, comprising:
a vehicle;
a first device, not permanently affixed to said vehicle capable of providing a data for a first and second feature;
a connections manager, wherein said connections manager
identifies available device connections of the first device, and to identify available vehicle connections of the vehicle, said available device connections include one or more wired connections and one or more wireless connections,
identifies first feature device connections, including a first and second device connection capable of communicating data related to the first feature,
identifies second feature device connections, including a third and forth device connection capable of communicating data related to the second feature,
identifies at least one vehicle connection, including a first vehicle connection, capable of communicating with at least one of said first and second device connections, said available vehicle connections include one or more wired connections and one or more wireless connections,
identifies at least one vehicle connection, including a second vehicle connection, capable of communicating with at least one of said third and forth device connections,
having a first set of guidelines to assign at least one device connection and at least one vehicle connection to each of the first and second features based on said first feature device connections, second feature device connections, said first vehicle connection, and said second vehicle connection; and
a communications system for transmitting said assigned at least one device connection and at least one vehicle connection for the first feature to the device and to the vehicle, and transmitting said assigned at least one device connection and at least one vehicle connection for the second feature to the device and to the vehicle.

11. The System of claim 10, wherein said vehicle connections include at least one of a Bluetooth based protocol, an HDMI connection, a Wi-Fi connection, an infrared based protocol, an auxiliary jack or a connection from a battery electric vehicle charging station.

12. The system of claim 11, wherein said first set of guidelines determines whether a bandwidth of each device connection in said first set of device connections can support said first feature.

13. The system of claim 10, wherein at least one of the devices is a mobile communication device.

14. The system of claim 10, wherein said first set of guidelines identify a first set of device connections that can support successfully transmitting data for providing said first feature; and identify a first set of vehicle connections that can support successfully transmitting data for providing said first feature.

15. A computer-readable storage medium storing computer-executable program instructions for connecting data related to a first and second feature, the first and second feature data communicated from at least one device to a vehicle, the instructions when executed cause the at least one processor to perform steps including:
determining available device connections of the device, wherein the device is not permanently affixed to the vehicle, said available device connections include one or more wired connections and one or more wireless connections;

determining available vehicle connections of the vehicle, said available vehicle connections include one or more wired connections and one or more wireless connections;

identifying first feature device connections, including a first and second device connection capable of communicating data related to the first feature;

identifying second feature device connections, including a third and forth device connection capable of communicating data related to the second feature;

identifying at least one vehicle connection, including a first vehicle connection, capable of communicating with at least one of said first and second device connections;

identifying at least one vehicle connection, including a second vehicle connection, capable of communicating with at least one of said third and forth device connections;

using a first set of guidelines to assign at least one device connection and at least one vehicle connection to each of the first and second features based on said first feature device connections, second feature device connections, said first vehicle connection, and said second vehicle connection;

transmitting said assigned at least one device connection and at least one vehicle connection for the first feature to the device and to the vehicle; and transmitting said assigned at least one device connection and at least one vehicle connection for the second feature to the device and to the vehicle.

16. The computer-readable storage medium of claim 15, wherein said vehicle connections include at least one of a Bluetooth based protocol, an HDMI connection, a Wi-Fi connection, an infrared based protocol, an auxiliary jack or a connection from a battery electric vehicle charging station.

17. The computer-readable storage medium of claim 15, wherein at least one of the devices is a mobile communication device.

18. The computer-readable storage medium of claim 15 wherein said first set of guidelines include:

identifying a first set of device connections that can support successfully transmitting data for providing said first feature; and identifying a first set of vehicle connections that can support successfully transmitting data for providing said first feature.

19. The computer-readable storage medium of claim 18, wherein said first set of guidelines includes:

determining whether a bandwidth of each device connection in said first set of device connections can support said first feature.

20. The computer-readable storage medium of claim 15, wherein said step of using a first set of guidelines includes:

using a first set of guidelines to assign a first connection pair having at least one device connection and at least one vehicle connection for supporting communication of said first feature between the device and the vehicle, said first set of guidelines based on said first feature device connections, second feature device connections, said first vehicle connection, and said second vehicle connection; and using said first set of guidelines to assign a second connection pair having at least one device connection and at least one vehicle connection for supporting communication of said second feature between the device to the vehicle, said first set of guidelines based on said first feature device connections, second feature device connections, said first vehicle connection, and said second vehicle connection.

* * * * *

UNITED STATES PATENT AND TRADEMARK OFFICE
CERTIFICATE OF CORRECTION

PATENT NO.         : 8,892,175 B2                                                     Page 1 of 1
APPLICATION NO.    : 13/459203
DATED              : November 18, 2014
INVENTOR(S)        : David Kirsch It is certified that error appears in the above-identified patent and that said Letters Patent is hereby corrected as shown below:

Claims

Column 10, line 63, Claim 1, delete "forth," insert --fourth--.

Column 11, line 3, Claim 1, delete "forth," insert --fourth--.

Column 12, line 20, Claim 10, delete "forth," insert --fourth--.

Column 12, line 30, Claim 10, delete "forth," insert --fourth--.

Column 13, line 12, Claim 15, delete "forth," insert --fourth--.

Column 13, line 19, Claim 15, delete "forth," insert --fourth--.

Signed and Sealed this
Twelfth Day of January, 2016

Michelle K. Lee
*Director of the United States Patent and Trademark Office*